(12) United States Patent
Browder et al.

(10) Patent No.: US 12,386,593 B1
(45) Date of Patent: Aug. 12, 2025

(54) SYSTEM AND METHOD FOR GENERATING AN INSTANCE ARRAY ASSOCIATED WITH AN INITIAL CLASS

(71) Applicant: Signet Health Corporation, North Richland Hills, TX (US)

(72) Inventors: Blake Browder, Dallas, TX (US); Joy Figarsky, Little Rock, AR (US)

(73) Assignee: Signet Health Corporation, North Richland Hills, TX (US)

( * ) Notice: Subject to any disclaimer, the term of this patent is extended or adjusted under 35 U.S.C. 154(b) by 0 days.

(21) Appl. No.: 18/963,610

(22) Filed: Nov. 28, 2024

(51) Int. Cl.
G06F 8/20 (2018.01)
G06F 8/34 (2018.01)

(52) U.S. Cl.
CPC . G06F 8/24 (2013.01); G06F 8/34 (2013.01)

(58) Field of Classification Search
CPC .................................... G06F 8/24; G06F 8/34
See application file for complete search history.

(56) References Cited

U.S. PATENT DOCUMENTS

| | | | |
|---|---|---|---|
| 8,527,942 B2* | 9/2013 | Foti | G06F 8/315 717/106 |
| 9,058,176 B2* | 6/2015 | Jentsch | G06F 8/35 |
| 9,665,348 B1* | 5/2017 | Black | G06F 8/34 |
| 10,672,506 B2 | 6/2020 | Butler | |
| 11,288,718 B2 | 3/2022 | Mahadevan | |
| 2003/0004956 A1* | 1/2003 | Johnson | G06F 16/289 |
| 2006/0265248 A1 | 11/2006 | Barnhart et al. | |
| 2008/0133274 A1 | 6/2008 | Warner | |
| 2012/0089987 A1* | 4/2012 | Hulick, Jr. | G06F 9/45508 719/312 |
| 2014/0089905 A1* | 3/2014 | Hux | G06F 8/24 345/522 |
| 2020/0286056 A1 | 9/2020 | Martino et al. | |

OTHER PUBLICATIONS

Medical Billing Software: Key Capabilities, Top Vendors, and Selection Tips Altexsoft website https://www.altexsoft.com/blog/medical-billing-software/.
Setting Up the Billing Interface Oracle https://docs.oracle.com/cd/E16365_01/fscm91pbr0/eng/psbooks/sbil/chapter.htm?File=sbil/htm/sbil10.htm.

* cited by examiner

*Primary Examiner* — Daxin Wu
(74) *Attorney, Agent, or Firm* — Caldwell Intellectual Property Law

(57) ABSTRACT

A system for generating an instance array associated with an initial class. The system may include at least a processor, and a memory communicatively connected to the at least a processor and containing instructions configuring the at least a processor to generate an instance array associated with an initial class. Instructions may include: receive an array associated with an initial class, define a new class using specific instances from the array associated with the class, verify the new class as a function of the specific instances associated with the class, and display the objects of the new class at a display device, wherein the display device presents a graphical user interface enabling a user to manipulate the new class.

16 Claims, 8 Drawing Sheets

SYSTEM AND METHOD FOR GENERATING AN INSTANCE ARRAY ASSOCIATED WITH AN INITIAL CLASS

FIELD OF THE INVENTION

The present invention generally relates to the field of class management. In particular, the present invention is directed to systems and methods for generating an instance array associated with an initial class.

BACKGROUND

Class management refers to the organization and handling of classes within object-oriented programming (OOP). Effective class management in programming leads to cleaner, more organized code, making it easier to develop, maintain, and scale applications.

SUMMARY OF THE DISCLOSURE

In an aspect, a system for generating an instance array associated with an initial class may include a computing device; wherein, the computing device may include at least a processor, and a memory communicatively connected to the at least a processor. The memory may contain instructions configuring the at least a processor to receive an array associated with an initial class, define a new class using specific instances from the array associated with the class, verify the new class as a function of the specific instances associated with the class, and display the objects of the new class at a display device, wherein the display device presents a graphical user interface (GUI) enabling a user to manipulate the new class.

In another aspect, a method for generating an instance array associated with an initial class may include receiving an array associated with an initial class, defining a new class using specific instances from the array associated with an initial class, verifying the new class as a function of the specific instances associated with an initial class, and displaying the objects of the new class at a display device, wherein the display device presents a GUI enabling a user to manipulate the new class.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2A is an exemplary illustration of a graphical user interface;

FIG. 2B is an exemplary illustration of a modified graphical user interface;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating an instance array associated with an initial class. The dynamic behavior of class management may present many difficulties, including integration with existing systems, performance overhead, error handling, and user interaction. Aspects of the present disclosure can be used to provide a robust framework for addressing the inherent challenges while enhancing usability, performance, and maintainability. Aspects of the present disclosure can also be used to optimize class management. This is so, at least in part, because the system and method utilize requirement criteria which may indicate necessary components for a successful class.

Aspects of the present disclosure allow for the generation of an instance array associated with an initial class. Exemplary embodiments illustrating aspects of the present disclosure are described below in the context of several specific examples.

Figure 1:
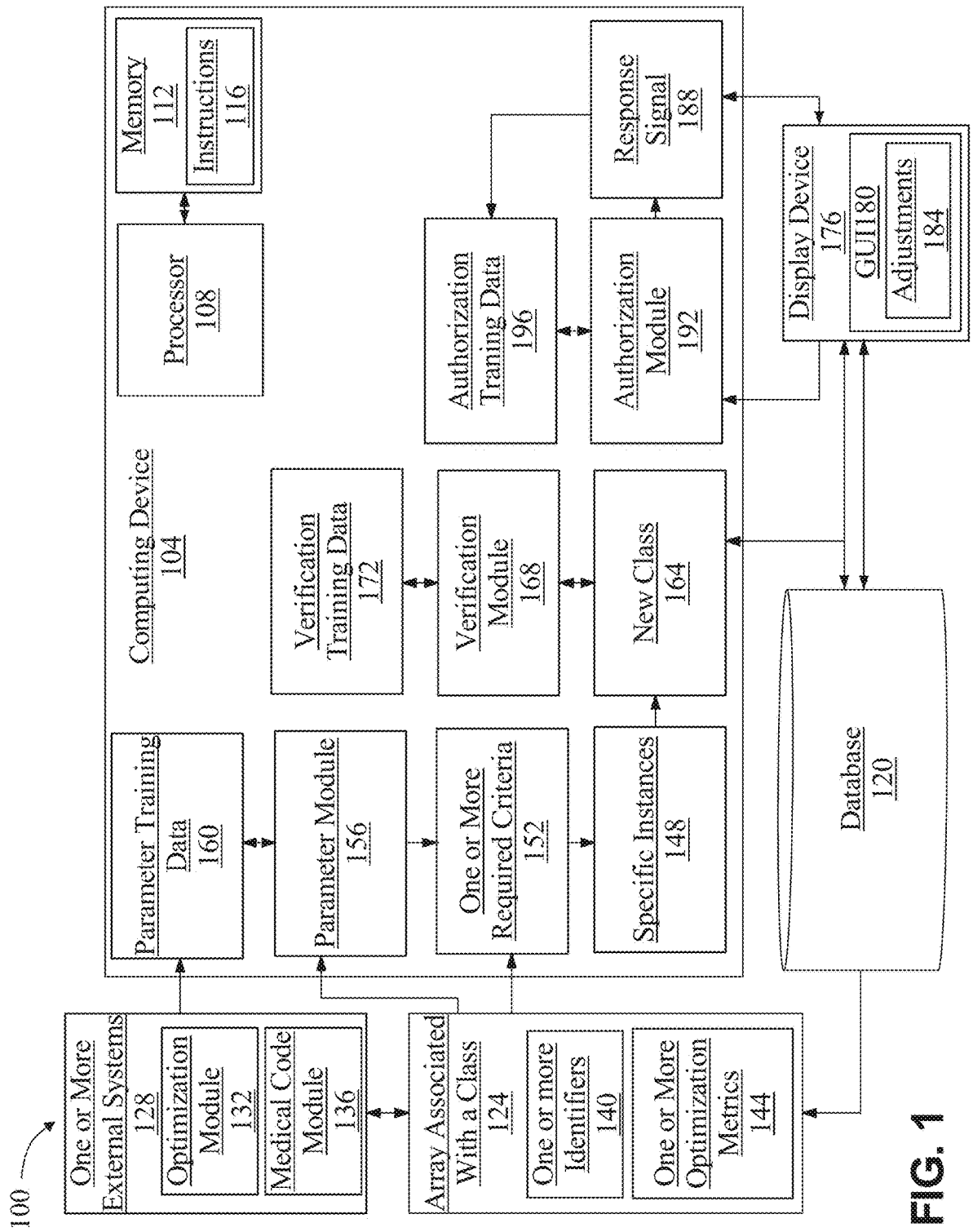
FIG. 1 is a block diagram of a system for generating an instance array associated with an initial class.

Referring now to FIG. 1, an exemplary embodiment of a system 100 for generating an instance array associated with an initial class is illustrated. In an embodiment, system 100 for generating an instance array associated with an initial class may include at least a processor 108 and a memory 112 communicatively connected to the at least a processor 108, wherein the memory 112 contains instructions 116 configuring the at least a processor 108 to generate an instance array associated with an initial class. Instructions 116 may include receive an array associated with an initial class 124, define a new class 164 using specific instances 148 from the array associated with the class, verify the new class 164 as a function of the specific instances 148 from the array associated with the class, and display the objects of the new class 164 at a display device 176, wherein the display device 176 presents a graphical user interface 180 (GUI) enabling a user to manipulate the new class 164.

With continued reference to FIG. 1, system 100 includes a computing device. Computing device 104 includes a processor 108 communicatively connected to a memory 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of the computing device 104, instructions 116 and/or information may be transmitted to primary memory wherein information may be processed. In one or more embodiments, information may only be populated within primary memory while a particular software is running. In one or more embodiments, information within primary memory is wiped and/or removed after the computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 108. In one or more embodiments, data is transferred from secondary to primary memory wherein processor 108 may access the information from primary memory.

Still referring to FIG. 1, system 100 may include a database 120. The database 120 may include a remote database. The database 120 may be implemented, without limitation, as a relational database, a key-value retrieval database such as a NOSQL database, or any other format or structure for use as database that a person skilled in the art would recognize as suitable upon review of the entirety of this disclosure. The database 120 may alternatively or additionally be implemented using a distributed data storage protocol and/or data structure, such as a distributed hash table or the like. The database 120 may include a plurality of data entries and/or records as described above. Data entries in database 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database 120 may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, the computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device 104 may transmit processes to server wherein computing device 104 may conserve power or energy.

With continued reference to FIG. 1, the at least a processor 108 may be configured to receive an array associated with an initial class 124. As used throughout this disclosure, "array" is a data structure that can hold a fixed-size sequence of elements of the same type. Each element may be accessed using an index, typically starting from zero. Key characteristics of an array may include its fixed size, homogeneous elements, and index-based access. "Class," as used throughout this disclosure is a blueprint for creating an object in object-oriented programming. An initial class may define properties or attributes and behaviors or methods that the object created from the class. Key characteristics of an initial class may include encapsulation, wherein classes bundle data and methods that operate on the data, promoting modular design, the use of objects, otherwise described as instances 148 which can hold their own state and behavior, and inheritance and polymorphism, wherein classes have the ability to inherit from other classes, allowing for code reuse and extending functionality. An array associated with an initial class 124 indicates that the array is a property or attribute of the class, allowing for the storage of multiple values related to an instance of the class. An array may be accessed, modified, and/or manipulated using various methods defined within the class. Such a design encapsulates the array within the class, providing a structured way to manage related data.

Continuing to reference FIG. 1, in an embodiment, at least a processor 108 may receive the array associated with an initial class 124 from various sources. Receiving an array associated with an initial class 124 may include multiple sub- or pre-steps which may include pre-processing steps such as the creation of the object and/or processing via method parameters defined within an initial class. For example, when an object of an initial class is created it may be passed as an argument to a constructor. A "constructor" is a special method in an initial class and can be used in constructor initialization processes. "Constructor initialization" refers to the process of using a constructor to set up an object's initial state when it is created. This may include assigning values to the object's attributes, which may include an array. Additionally, the array may be passed to a method of the class, which may then store or process that array. In an embodiment, arrays may be read from files. In such an embodiment, an initial class may include one or more methods configured to load data from a file into an array. Alternatively, and/or additionally, an array may be generated from user input, where the class methods may accept input data to fill the array. For example, and without limitation, this may include manual input and/or input from another process, including machine-learning models configured to populate arrays with relevant data. Further, in an embodiment wherein communications occur over a network, such as web apps, local networks, and/or global networks, an array may be received as part of a response from a server, which may then be processed by an initial class. In an embodiment, classes may retrieve arrays of data from database 120 through queries. The retrieved data may be stored in an array associated with an initial class 124.

Still referring to FIG. 1, in an embodiment system 100 may interface with various other systems and/or processes. This may include receiving an array associated with an initial class 124, which may have been partially and/or wholly generated or processed by one or more systems/processes. In an embodiment, the array associated with an initial class 124 may be received from one or more external systems 128 configured to pre-process the array associated with an initial class 124. This may include receiving the array associated with an initial class 124 from one or more databases 120. For example, and without limitation, an array associated with an initial class 124 may include objects generated by an optimization module 132 and/or a medical module 136. This may include objects related to optimal pricing related to medical codes representing care provided. In a non-limiting example, optimization module 132 may be consistent with one or more aspects of the systems and methods described in U.S. patent application Ser. No. 18/963,603, filed on Nov. 28, 2024, titled "APPARATUS AND METHOD FOR ADAPTIVE DATA CONVERSION" which is incorporated by reference herein in its entirety. Further, in a non-limiting example, medical module 136 may be consistent with one or more aspects of the systems and methods described in U.S. patent application Ser. No. 18/957,811, filed on Nov. 24, 2024, titled "APPARATUS AND METHOD FOR DETERMINING A CODE AS A FUNCTION OF SUBJECT DATA" which is incorporated by reference herein in its entirety.

Still referring to FIG. 1, in an embodiment the array associated with an initial class 124 may include identifiers 140 and/or optimization metrics 144. As used throughout this disclosure, an "identifier" is a unique symbol, code, or label used to distinguish one entity from another within a system or context. Key characteristics of identifiers 140 may include their uniqueness, format, and persistence. Identifiers 140 are designed to be unique within their context, ensuring that no two entities share the same identifier at a given time. Additionally, identifiers 140 may take various forms, including alphanumeric strings, numerical codes, or any combination of characters and symbols. Furthermore, persistence is rather important as it allows identifiers 140 to remain consistent over time, allowing entities to be reliably tracked and referenced. Identifiers 140 may include personal identifiers, healthcare identifiers, product identifiers, database identifiers, digital identifiers, and/or the like. For example, and without limitation, identifiers 140 may include social security numbers, national identification numbers, patient ID, healthcare provider numbers, universal product codes, international standard book numbers, primary keys, foreign keys, domain names, medical codes and/or email addresses. Through the use of identifiers 140 data integrity is maintained by ensuring accurate tracking and retrieval of information, interoperability may facilitate data exchange between different systems and organizations, and processes such as searching, sorting, and managing records are simplified.

Continuing to reference FIG. 1, as used throughout this disclosure, an "optimization metric" is a specific variable or set of variables used to assess the performance and effectiveness of an optimization process or solution. Such an metric may assist in quantifying the progress toward a desired object and may provide insight into how well a model or strategy is performing. For example, and without limitation optimization metrics 144 may include objective function values, convergence rates, feasibility ratios, resource utilization, performance indexes, and/or the like. In an embodiment, one or more optimization metrics 144 may be present in an array associated with an initial class 124. This may indicate to system 100 and/or external systems 128 the optimal prices associated with care provided and/or other integral information for successful claims. As used throughout this disclosure, a "claim" is a formal request made to an individual or entity, in many cases an insurance company, for compensation or coverage for a loss, damage, or liability that falls within the terms of an insurance policy. Liability that falls within the terms of an insurance policy may include care provided by a hospital or another care-provider.

In further reference to FIG. 1, at least a processor 108 may be configured to define a new class 164 using specific instances 148 from the array associated with an initial class 124. As used throughout this disclosure, "instance" refers to a specific occurrence of an initial class. Alternatively, "object," as used throughout this disclosure refers to an instance of an initial class that can perform operations and hold state. Although closely related and often used interchangeably the small distinctions may be important in practice. Defining a new class 164 using specific instances 148 from an array associated with an existing class may include defining the existing class, creating a method configured to retrieve specific instances 148 from the array based on one or more required criteria 152, and defining the new class 164 using those specific instances 148. For example, in an embodiment, generating the new class 164 using specific instances 148 from the array associated with an initial class 124 may include identifying one or more required criteria 152, selecting specific instances 148 based on the one or more required criteria 152, and instantiating the new class 164 using the specific instances 148 based on the one or more required criteria 152. In an embodiment, specific instances 148 may include historical data, wherein historical data may include medical record data and/or payor data. Medical records may include personal information, medical history, current medications, immunization records, clinical notes, laboratory and test results, treatment plans, surgical history, vital signs and measurements, emergency and hospital records, consent and authorization forms, mental health records, patient preferences and values, and/or the like. As used throughout this disclosure, "payor" refers to an individual or entity that is paying for charges related to care provided. For example, a payor may include an insurance company. Therefore, payor data is data related to a payor. For example, and without limitation, payor data may include member information, policy details, benefit information, claims data, utilization data, provider information, payment history, coordination of benefits, quality and performance metrics, fraud detection data, and/or the like. "Required criteria," as used throughout this disclosure, refers to criteria necessary for a successful claim. A successful claim may be defined as a claim that was allowed, such as an allowance up to a certain percentage of the claim. For example, if $100 was claimed and $75-$100 was paid the claim may be classified as allowed. This would mean the allowance threshold may be from 75%-100%. Alternatively, what a successful claim is defined as may be a sliding scale based on parameters surrounding an optimization metric 144.

With continued reference to FIG. 1, in an embodiment, required criteria 152 may be a list of absolute requirements, scaled or weighted requirements, and/or the like. These parameters may be set in relation to external systems 128 or processes as previously discussed in relation to optimization module 132 and/or medical code module 136. These processes may generate parameters that determine the most optimal price for services or care provided as a function of historic claim data. Once parameters are defined system 100 may define a new class 164 based on said parameters, wherein an initial class is searched for specific instances 148 based on the one or more required criteria 152 determined by the parameters and a new class 164 is instantiated. In an embodiment, defining parameters may be accomplished using a parameter module 156, wherein the module may include a machine-learning model and may be trained using exemplary parameter training data 160, including an exemplary plurality of claim data, including allowed and disallowed claim data, correlated to exemplary allowance parameters. A plurality of claim data may include allowed or disallowed claim data such as medical codes, allowance codes, disallowance codes, and/or the like. Parameter module 156 may be configured to provide context to an allowance or a disallowance, which may be fed into an optimization module 132, wherein the optimization module 132 prioritizes necessary criteria such as one or more required criteria 152. Such an embodiment may be accomplished using a dynamic system utilizing one or more classification, feature learning and/or clustering algorithms. Further embodiments may include utilizing a neural network in which each node contributes context to the data.

With continued reference to FIG. 1, a "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 120, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Further referencing FIG. 1, a "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of elements of data, as defined above, with each other. As a non-limiting example, feature learning algorithm may detect co-occurrences of elements, as defined above, with each other. Computing device 104 may perform a feature learning algorithm by dividing elements or sets of data into various sub-combinations of such data to create new elements of data, and evaluate which elements of data tend to co-occur with which other elements. In an embodiment, first feature learning algorithm may perform clustering of data.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device 104 may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\mathrm{argmin}_{c_i \in C} \mathrm{dist}(c_i, x)^2$, where argmin includes argument of the minimum, $c_i$ includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_{i_3} S_i^{xt}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between a elements to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

In further reference to FIG. 1, the at least a processor 108 may be configured to verify the new class 164 as a function of the specific instances 148 associated with the class. In an embodiment, verifying the new class 164 as a function of the specific instances 148 associated with an initial class may include a manual verification by a user, wherein a user views the objects of the new class 164. In one or more additional steps, verifying the new class 164 may include utilizing automated testing, wherein a verification module 168 is trained to generate test cases based on the expected behavior of the class. The verification model may learn from existing tests and create new scenarios to check edge cases or unusual inputs. In another embodiment, verifying the new class 164 may include utilizing anomaly detection. Which may implement verification module 168 to identify unexpected behavior in the class by training on normal operation data. The verification module 168 may flag anomalies that may indicate bugs and/or issues. Additionally, both of these processes may be integrated wherein a verification module 168 utilizes automated testing strategies and anomaly detection in order to verify the new class 164. Verification module 168 may include a machine-learning model, which may be trained using verification training data 172 including exemplary specific instances 148 and exemplary new classes 164 correlated with exemplary verified accurate new classes 164. Further, in some embodiments, training data 172 may include exemplary specific instances correlated to exemplary new classes. This may allow verification module 168 to compare the new class 164 to the new class generated by verification module 168 to verify new class 164.

Still referencing FIG. 1, the at least a processor 108 may be configured to display the objects of the new class 164 at a display device 176, wherein the display device 176 presents a GUI 180 enabling a user to manipulate the objects of the new class 164. A "user" is an individual who interacts with a system, application, or product. Here, for example, a user may include hospital personnel, which may include medical staff, allied health professionals, support staff, administrative personnel, emergency and support services, and/or the like. As used throughout this disclosure, "display device" refers to an electronic component that visually presents information or data to a user. For example, and without limitation display device 176 may include monitors, televisions, smartphones or tablets, projectors, digital signage, wearable displays, and/or the like. A "GUI" is a visual interface that allows users to interact with electronic devices through graphical elements rather than text-based commands. Features of a GUI 180 may include, but are not limited to windows, icons, menus, buttons, sliders and controls, and/or any other graphical content configured to assist a user in interacting with an electronic device. As used in this context, "manipulation" refers to actions or interactions a user may perform to modify, control, or navigate through an interface. Such manipulations may require the use of input devices such as, but not limited to mouses, keyboards, and/or touchscreens. For example, manipulations may include clicking, dragging, scrolling, resizing, zooming, hovering, right-clicking, keyboard shortcuts, inputting data, removing data, and/or modifying data. For example, the GUI 184 may enable a user to make one or more adjustments 184 to the objects of the new class 164 by adding instances, deleting instances, and/or editing instances.

In continued reference to FIG. 1, in an embodiment, GUI 180 may include one or more event handlers. As used throughout this disclosure, "event handler" refers to functions or methods designed to respond to specific events in a program, particularly in user interface contexts. An "event" is an occurrence that is detected by the program. For example, this may include a mouse click, keyboard input, and/or a change in a form field. In an embodiment, event handlers may include a listener and or binding process. A listener is a function that listens for specific events on an element. For instance, a button or an input field. A binding process is the process of associating an event with its handler. When an event occurs, an event object may be passed to the handler, containing details about the event. Event handlers allow for interactivity, modularity, and reusability. In such that, event handlers enable applications to respond dynamically to user actions, organize code by separating event handling logic from other program logic, and the same handler may be used for multiple elements and/or events. Further, in an embodiment, the feedback from an event handler may be utilized as training data in the training or retraining of models and/or modules as described here within.

In further reference to FIG. 1, in an embodiment the GUI 180 may present the objects of the new class 164 in the form of a chargemaster. A chargemaster, otherwise referred to as a charge description master of CDM is a master file built within the hospital information system. It may contain multiple data elements related to the charges that are assigned to items and services used or provided to a patient. Each item in the chargemaster is assigned a set price used to generate bills. Such a set price may be determined by one or more optimization metrics 144 as discussed here within. The set price may be a starting point for negotiations between the hospital and the payor. System 100 assists in maintaining the chargemaster enabling accurate data for reporting, ensuring government and financial compliance, and is one of the most important tools between providers and payors. Key data elements of a chargemaster may include charge codes or item numbers, descriptions, general ledger (GL) numbers, department designations, prices/charges, CURRENT PROCEDURAL TERMINOLOGY (CPT) codes, and/or revenue codes. Charge codes or item codes may include hospital specific codes used to identify items in the charging process for the hospital staff. Descriptions may include long and/or short descriptions. Long descriptions may include details of the procedure or supplies; whereas short descriptions may include abbreviations that may not be understood as easily as longer descriptions. For example, and without limitation a long description may include "MRI Abdomen Without Contrast," whereas the short description may include, "MRI Abd w/o." The length of characters may be system specific and may depend on who the chargemaster is being displayed to. For example, a chargemaster being displayed to a patient unfamiliar with medical codes and lingo, a long description may be necessary. In an embodiment, wherein the chargemaster is being displayed to medical professionals and other users familiar with medical codes and lingo a short description may be used. In some instances, a long description may be necessary when negotiating with a payor. Therefore, system 100 may allow for short descriptions in one viewing area, and expanded, longer descriptions, when necessary, in another viewing area. GL codes allow charges to be mapped to the correct financial ledgers for cost reporting. Department codes identify the department the service was performed in. These codes may be used in cost reporting as well as to document each department's activity that may be used for budget management. A revenue code identifies where the patient was when they received care or services or the type of supplies they received. Revenue codes may include a 4-digit number and may include sub-categories that better define where a service was performed or where care was provided. A CPT code is a code set licensed and maintained by the American Medical Association (AMA). Each code may describe a service or supply that may be provided and are designed to communicate information to the government and insurance providers or payors. In some embodiments, component codes may be used instead of CPT codes. Component codes refer to a "lesser" code that may only describe part of a more comprehensive procedure. For example, when a comprehensive procedure is done the component code cannot be billed in addition to the comprehensive code. Further, HCPCS codes, otherwise known as Level II codes (CPT codes are Level I codes), may be used to identify products, procedures and supplies that are not included in the CPT Level I codes. Such codes may be replaced by permanent codes and cross walked to new codes. Additionally, relevant codes may include modifiers. Modifiers may include a 2-digit code used to communicate more detailed information related to a service or procedure. Such an addition to the one or more present medical codes may be generated by system 100 or through other various processes as discussed in detail in regard to pre-processing and optimization. Modifiers may include pricing modifiers and/or informational modifiers. For example, and without limitation, a modifier may be used when payment may be increased/decreased, to identify if it's a technical or professional service, to identify repeated services, to identify an increased/reduced/unusual service, to identify a specific body area, to designate unilateral or bilateral procedure, and/or the like. Reference FIGS. 2A and 2B for further description.

Continuing to reference FIG. 1, in an embodiment, adjusting the objects of the new class 164 may further include an authorization process. The authorization process may include receiving an adjustment 184 signal, generating a response signal 188 as a function of a comparison of the adjustment 184 signal, the objects of the new class 164, and an optimization metric 144, and transmitting the response signal 188 to the GUI 180. For example, an insurance adjuster may adjust a claim's allowable amount, which may be communicated to system 100 by way of an adjustment 184 signal, wherein system 100 then generates a response signal 188 based on a comparison of the adjustment 184 signal, the objects of the new class 164, and an optimization metric 144, and transmits the response signal 188 either accepting, rejecting, or making a counter based on the comparison. In some embodiments, the response signal 188 may be input by a user and or alternatively decided based on specific parameters. Specific parameters may include ranges in which system 100 may accept, decline, or counter an offer. Response signal 188 may include an explanation code, wherein each code is associated with a reason behind the action. For example, and without limitation explanation codes may include a code associated with missing data, a code associated with misclassified billing, and/or the like. A response signal 188 may be generated by authorization module 192 that may analyze changes or manipulations and their relationship with the objects of the new class 164. For example, response signal 188 may be generated by system 100 indicating to hospital staff that one or more of their changes align or don't align with optimization metrics, codes, etc. and why or why not. Authorization module 192, may include a machine-learning model and may be trained on authorization training data 196 such as exemplary adjustment 184 signals and exemplary optimization metrics 144 correlated with exemplary response signals 188. In one or more embodiments, authorization module 192 may output response signal 188, which may provide suggestions, reasons for acceptance/denial, and/or an authorization to move forward. In some embodiments, authorization module 192 may be utilized in concurrence with a final authorization by an individual prior to sending the objects of the new class 164 to a payor, wherein authorization module 192 generates a suggestion that a user may either take or override.

In continued reference to FIG. 1, in an embodiment system 100 may transmit objects of the new class 164 to a database 120. Database 120 may be utilized to store objects of the new class 164 either locally and or globally. In an embodiment, database 120 may be accessed by system 100 to be updated and/or to train and/or retrain models/modules used in the implementation of creating objects of the new class 164 with optimization features. This may allow system 100 to compare a first new class 164 with a second new class 164 and update system 100 based on outliers, anomalies, and learned relationships. Such an ability increases the accuracy of the analytical methods and processes utilized by system 100.

With continued reference to FIG. 1, in one or more embodiments, computing device 104 may implement one or more aspects of "generative artificial intelligence (AI)," a type of AI that uses machine learning algorithms to create, establish, or otherwise generate data such as, without limitation, identifiers 140, optimization metrics 144, objects of the new class 164 parameters, response signal 188 data, and/or the like in any data structure as described herein (e.g., text, image, video, audio, among others) that is similar to one or more provided training examples. In an embodiment, machine learning module described herein may generate one or more generative machine learning models that are trained on one or more set of training data as described throughout this disclosure in relation to specific models. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution P(X, Y) on a given observable variable x, representing features or data that can be directly measured or observed (e.g., claim data and claim manipulation data) and target variable y, representing the outcomes or labels that one or more generative models aims to predict or generate (e.g., response signal 188 data). In some cases, generative models may rely on Bayes theorem to find joint probability; for instance, and without limitation, Naïve Bayes classifiers may be employed by computing device 104 to categorize input data such as, without limitation, claim data and/or claim manipulation data into different classes, labels, cohorts, categories or the like such as, without limitation, wholly accepted, wholly denied, and/or partially accepted/denied.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 3.

With continued reference to FIG. 1, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 3 to distinguish between different categories e.g., accepted versus denied, or states e.g., TRUE vs. FALSE within the context of generated data such as, without limitations, response signal 188 data, and/or the like. In some cases, computing device 104 may implement one or more classification algorithms such as, without limitation, Support Vector Machines (SVM), Logistic Regression, Decision Trees, and/or the like to define decision boundaries.

In a non-limiting example, and still referring to FIG. 1, generator of GAN may be responsible for creating synthetic data that resembles real response signal 188 data. In some cases, GAN may be configured to receive claim data such as, without limitation, optimal prices, historical claim outcomes, reasons for denial and/or acceptance, claim manipulation data and/or the like, as input and generates corresponding response signal 188 data containing information describing or evaluating the performance of one or more optimized pricing based on historical claim data. On the other hand, discriminator of GAN may evaluate the authenticity of the generated content by comparing it to real response signals 188, for example, discriminator may distinguish between genuine and generated content and providing feedback to generator to improve the model performance.

With continued reference to FIG. 1, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 1, VAE may be used by computing device 104 to model complex relationships between claim data and claim manipulation data e.g., optimal prices, historical claim outcomes, reasons for denial and/or acceptance, claim manipulation data, and/or the like. In some cases, VAE may encode input data into a latent space, capturing response signal 188 data. Such encoding process may include learning one or more probabilistic mappings from observed claim data to a lower-dimensional latent representation. Latent representation may then be decoded back into the original data space, therefore reconstructing the claim data. In some cases, such decoding process may allow VAE to generate new examples or variations that are consistent with the learned distributions.

Further referring to FIG. 1, additionally, or alternatively, one or more generative machine learning models may utilize one or more predefined templates representing, for example, and without limitation, correct response signal 188 data. In a non-limiting example, one or more response templates (i.e., predefined models or representations of correct and ideal response signal 188 data) may serve as benchmarks for comparing and evaluating plurality of claim data and claim manipulation data.

Still referring to FIG. 1, computing device 104 may configure generative machine learning models to analyze input data such as, without limitation, claim data and claim manipulation data to one or more predefined templates such as a response template representing correct response signal 188 data described above, thereby allowing computing device 104 to identify discrepancies or deviations from accurate response signals 188. In some cases, computing device 104 may be configured to pinpoint specific errors in claim data and/or claim manipulation data or any other aspects of the claim data and/or claim manipulation data. In a non-limiting example, computing device 104 may be configured to implement generative machine learning models to incorporate additional models to detect additional relationships between historic claim data of other classes and current claim data for objects of the new class 164. In some cases, errors may be classified into different categories or severity levels. In a non-limiting example, some errors may be considered minor, and generative machine learning model such as, without limitation, GAN may be configured to generate response signal 188 data contain only slight adjustments while others may be more significant and demand more substantial corrections. In some embodiments, computing device 104 may be configured to flag or highlight anomalies in claim data, altering the objects of the new class 164 to require corrected input, directly on the claim data and/or claim manipulation data using one or more generative machine learning models described herein. In some cases, one or more generative machine learning models may be configured to generate and output indicators such as, without limitation, visual indicator, audio indicator, and/or any other indicators as described above. Such indicators may be used to signal the detected error described herein.

Still referring to FIG. 1, in some cases, one or more generative machine learning models may also be applied by computing device 104 to edit, modify, or otherwise manipulate existing data or data structures. In an embodiment, output of training data used to train one or more generative machine learning models such as GAN as described herein may include claim data correlated with optimized claim data that linguistically or visually demonstrate modified claim data e.g., claim data associated with an optimization metric 144, and/or the like. In some cases, response signal 188 data may be synchronized with claim data and/or claim manipulation data.

Additionally, or alternatively, and still referring to FIG. 1, computing device 104 may be configured to continuously monitor claim data and/or claim manipulation data. In an embodiment, computing device 104 may configure discriminator to provide ongoing feedback and further corrections as needed to subsequent input data (e.g., new class manipulations). An iterative feedback loop may be created as computing device 104 continuously receive real-time data, identify errors as a function of real-time data, delivering corrections based on the identified errors, and monitoring user response, device response signal 188, and/or the like on the delivered corrections. In an embodiment, computing device 104 may be configured to retrain one or more generative machine learning models based on response signal 188 data or update training data of one or more generative machine learning models by integrating response data into the original training data. In such embodiment, iterative feedback loop may allow machine learning module to adapt to the user's needs and performance, enabling one or more generative machine learning models described herein to learn and update based on response signals 188 and their acceptance rates and generated feedback.

With continued reference to FIG. 1, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models may be used to generate response signals 188 in response to one or more manipulations to objects of the new class 164.

Still referring to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by computing device 104 to generate response signal 188 data. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models may be used to generate a response signal 188 as described herein. As an ordinary person skilled in the art, upon reviewing the entirety of this disclosure, will be aware of various multi-model neural network and combination thereof that may be implemented by system 100 in consistency with this disclosure.

Figure 2A:
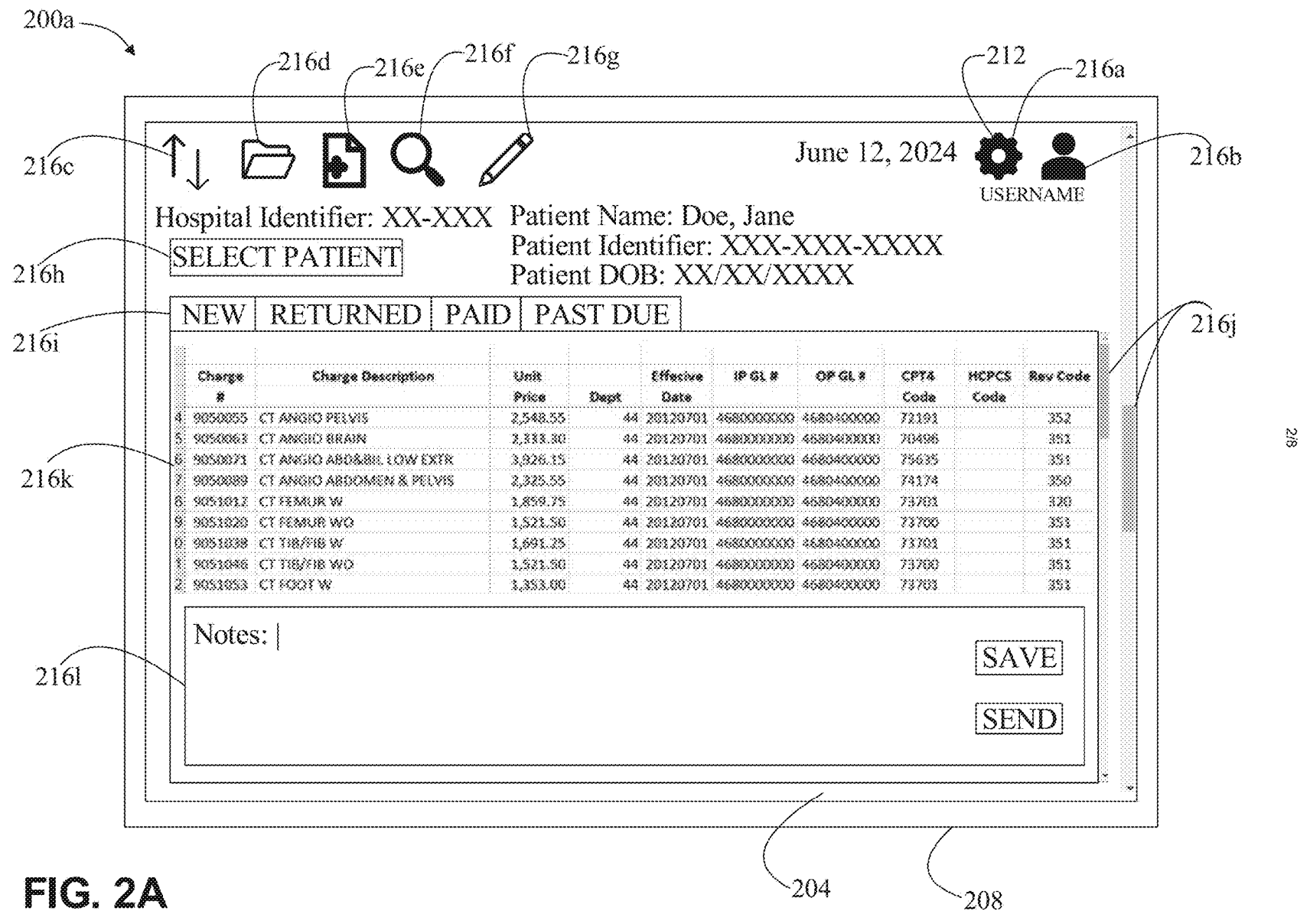

Now referring to FIG. 2A, an exemplary illustration 200*a* of a GUI is shown. In an embodiment, GUI may be displayed using a downstream device 208. In an embodiment, the graphical user interface 204 may include at least a visual element 212. In an embodiment, the visual element 212 may include an interactive element 216. In an embodiment the interactive element 216 may allow a user to engage directly with the graphical user interface 204 through a variety of actions.

In an embodiment, the interactive element 216 may include a settings gear 216*a*, a profile icon 216*b*, a sorting icon 216*c*, a folder icon 216*d*, a new task icon 216*e*, a find icon 216*f*, an edit icon 216*g*, a select patient button 216*h*, one or more tabs 216*i*, a scroll bar icon 216*j*, text description 216*k*, note window 216*l* and/or the like.

In an embodiment, the interactive element 216 may include a settings gear 216*a*. In an embodiment, the settings gear 216*a* may enable users to access the system or application settings where they may modify preferences and configurations. Without limitation, by clicking on the settings gear 216*a*, users may adjust features like notifications, display options, account details, and the like. In an embodiment, the settings gear 216*a* may represent control over personalizing the environment within the application. In an embodiment, the settings gear 216*a* may ensure that users can customize their experience to meet their specific needs.

In an embodiment, the interactive element 216 may include a profile icon 216*b*, which may allow users to access their personal profile settings. In an embodiment, the profile icon 216*b* may link to a page where users may view and edit their personal information, such as their name, contact details, or profile picture. In an embodiment, the profile icon 216*b* may make it simple for users to manage their account and view related data quickly. In an embodiment, the profile icon 216*b* may be placed in a convenient location, allowing easy access to account settings. In an embodiment, the profile icon 216*b* may help users maintain control over their profile, ensuring that their information stays up-to-date.

In an embodiment, the interactive element 216 may include a sorting icon 216*c*, which may allow users to organize data based on specific criteria. In an embodiment, the sorting icon 216*c* may be useful when dealing with large datasets or lists that need to be filtered or reordered. Without limitation, by clicking the sorting icon 216*c*, users may arrange items by various attributes such as date, name, priority, and the like. In an embodiment, the sorting icon 216*c* may simplify the process of locating specific information, making the interface more efficient to use. In an embodiment, the sorting icon 216*c* may ensure that users can easily customize how they view and interact with the content.

In an embodiment, the interactive element 216 may include a folder icon 216*d*, which may represent access to a file or document management system. Without limitation, by clicking on the folder icon 216*d* it may open a directory or list of stored files, allowing users to organize their content within the application. In an embodiment, the folder icon 216*d* may be essential for managing documents, media, or other file types efficiently. In an embodiment, the folder icon 216*d* may be associated with file storage and navigation, making it a familiar and intuitive tool for users. In an embodiment, the folder icon 216*d* may aid in keeping information organized and accessible within the system.

In an embodiment, the interactive element 216 may include a new task icon 216*e*, which may allow users to create or add a new item to their task list or project. In an embodiment, the new task icon 216*e* may provide a quick way for users to input new assignments or goals, streamlining task management. In an embodiment, the new task icon 216*e* once clicked, may open a form or prompt where users may specify details about the new task. In an embodiment, the new task icon 216*e* may help users stay organized by adding tasks efficiently as they arise. In an embodiment, the new task icon 216*e* may be a valuable tool for productivity, helping users keep track of their to-do lists.

In an embodiment, the interactive element 216 may include a find icon 216*f*, which may function as a search tool for locating specific information within the application. In an embodiment, the find icon 216*f* may allow users to quickly search through data, files, or content to pinpoint exactly what they need. In an embodiment, the find icon 216*f* may be especially useful in applications that manage large volumes of information or files. In an embodiment, the find icon 216*f* may enhance efficiency by reducing the time spent manually browsing through content. Continuing, by providing a fast search function, users may access information more quickly and effectively.

In an embodiment, the interactive element 216 may include an edit icon 216*g*, which may enable users to modify or update existing content within the application. Continuing, by clicking on the edit icon 216*g*, it may bring users to an editable version of the item, such as a text document, task, or file. In an embodiment, the edit icon 216g may allow users to make corrections or updates as needed, maintaining the accuracy of the information. In an embodiment, the edit icon 216g may ensure that content remains current and can be easily adjusted as situations or data change. In an embodiment, the edit icon 216g may be a crucial tool for users who frequently update or revise their work.

In an embodiment, the interactive element 216 may include a "select patient" button 216h. "Select patient" button 216h may enable a user to click "select patient" button 216h opening a secondary window that allows a user to search a database for a patient. Once the patient has been located using one or more identifiers, a user may select a patient and the patient's name, patient identifier, and patient date of birth (DOB) will be populated based on the selection.

In an embodiment, interactive element 216 may include one or more tabs 216i. For example, and without limitation one or more tabs 216i may include a "new" tab, a "returned" tab, a "paid" tab, and/or a "past due" tab. A user may click into each tab and the window below one or more tabs 216i will populate with related data. The orientation of tabs may allow a user to maintain organization and allow for lower processing times due to a smaller volume of related data associated with each tab.

In an embodiment, the interactive element 216 may include a scroll bar icon 216j, which may provide users with the ability to navigate through long pages of content. In an embodiment, the scroll bar icon 216j may be essential when the content exceeds the available screen space, allowing users to scroll vertically or horizontally. In an embodiment, the scroll bar icon 216j may help users move through information at their own pace, ensuring they can access all relevant content. In an embodiment, the scroll bar icon 216j may be particularly useful in applications with extensive data, such as documents or databases. In an embodiment, the scroll bar icon 216j may enhance the user interface by making navigation simple and intuitive.

In an embodiment, the interactive element 216 may include a text or numerical description 216k, which may provide additional information or context about a specific icon or feature. In an embodiment, the text or numerical description 216k may help users understand the purpose of a listed item, making the interface more user-friendly. In an embodiment, the text or numerical description 216k may be displayed when a user hovers over an icon, providing clarification without cluttering the interface. In an embodiment, the text or numerical description 216k may improve the usability of the system, particularly for new or unfamiliar users. Additionally, in an embodiment a user may click on text or numerical description, which may provide a window with additional notes or comments.

In an embodiment, interactive element 216 may include a note window 216l, which may provide a user with the ability to enter notes and/or comments in relation to a selected text or numerical description 216k. Note window 216l may include a save and/or a send button, wherein the save button may save a user's work locally and the send button may update the class with any notes and/or changes made.

Figure 2B:
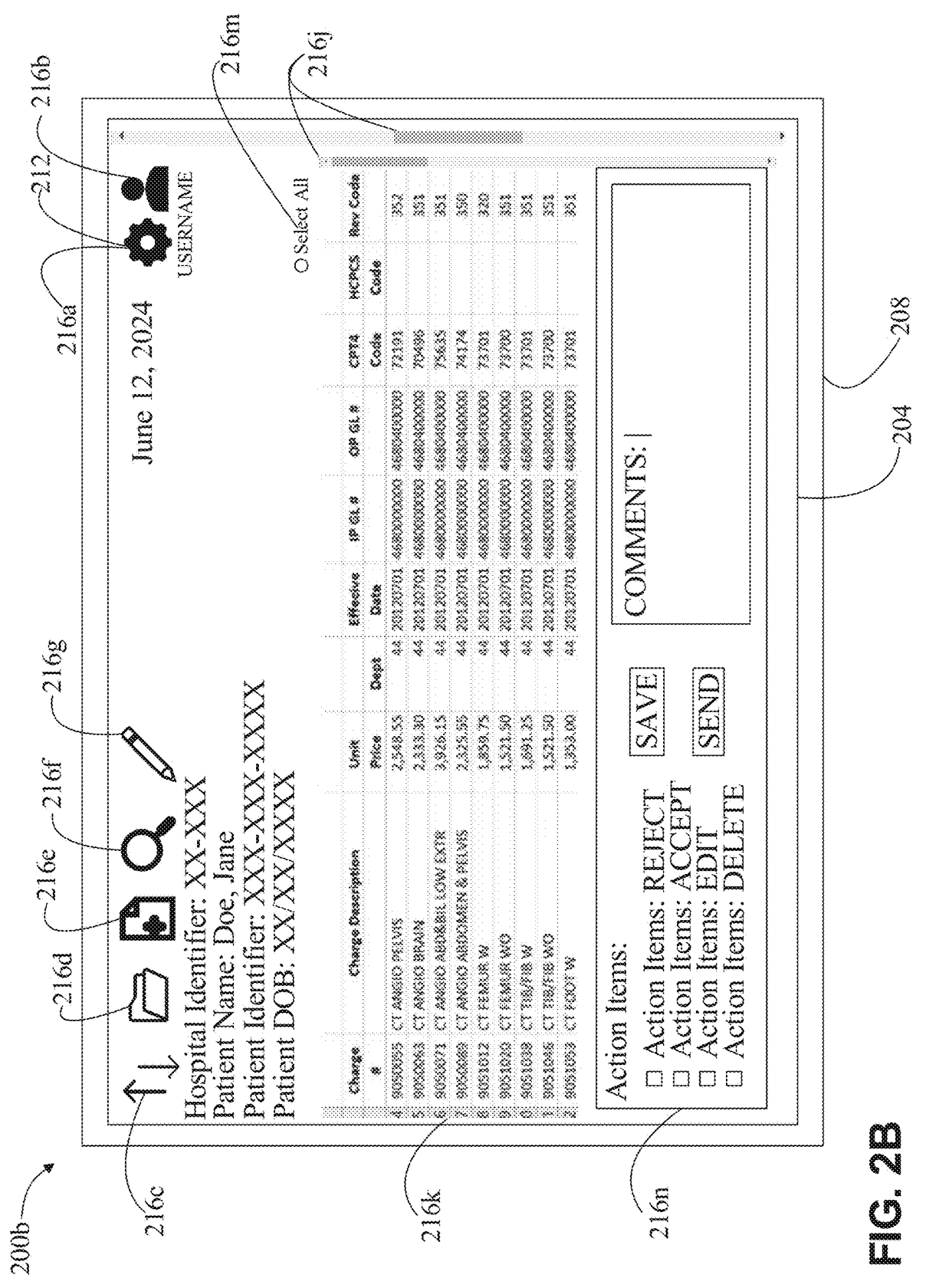

Now referring to FIG. 2B, an exemplary illustration 200b of a modified GUI is shown. In an embodiment, interactive element 216 may include a "select all" button 216m, wherein selecting the circle next to the text "select all," will highlight the entirety of the field displaying text or numerical description 216k. In another embodiment, user may select individual text or numerical description 216k. "Select all" button 216m may enable a user to save time in instances where a key text or numerical description 216k is missing or incorrect.

In an embodiment, interactive element 216 may include an "action items" window 216n, wherein the "action items" window 216n allows a user to check a box from a list of action items and/or leave a comment. Additionally, "action items" window 216n may include a save and/or send button, enabling a user to save their work locally, and/or send their edits to another party for review.

Figure 3:
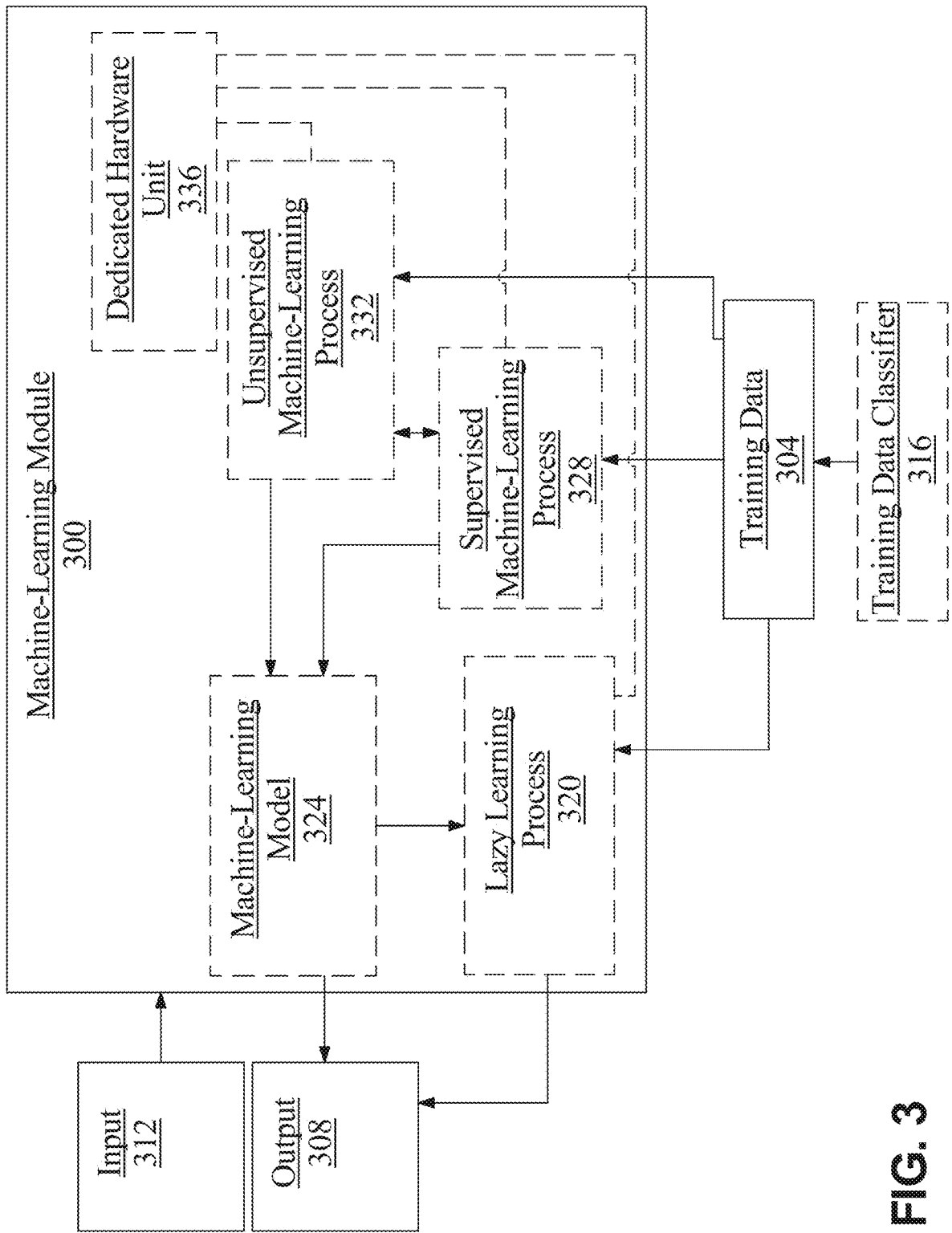
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example input data of exemplary new classes may be correlated to output of exemplary adjustments and exemplary response signals.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to characterize successful, unsuccessful, and/or partially successful claim data.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include any inputs as described above as inputs, outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
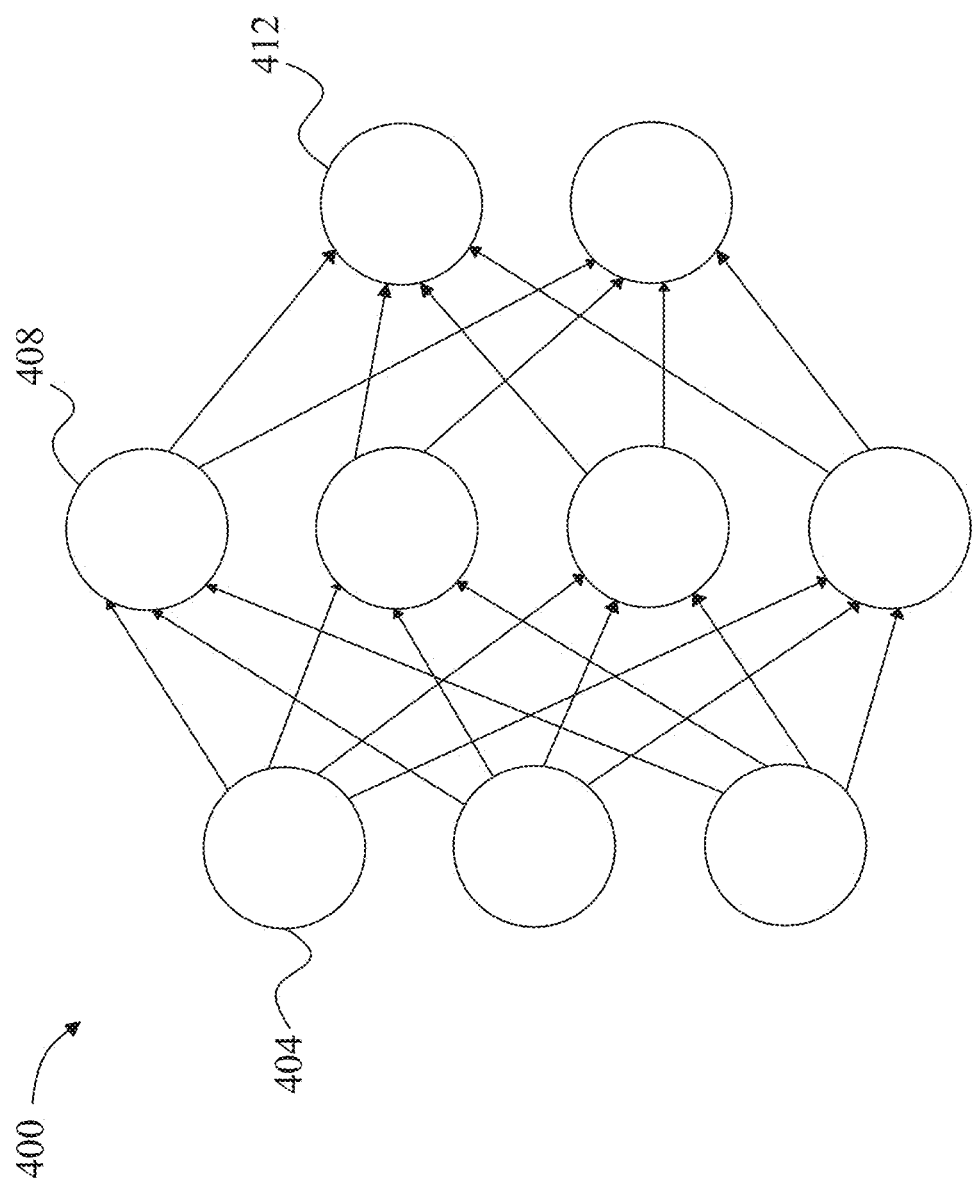
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
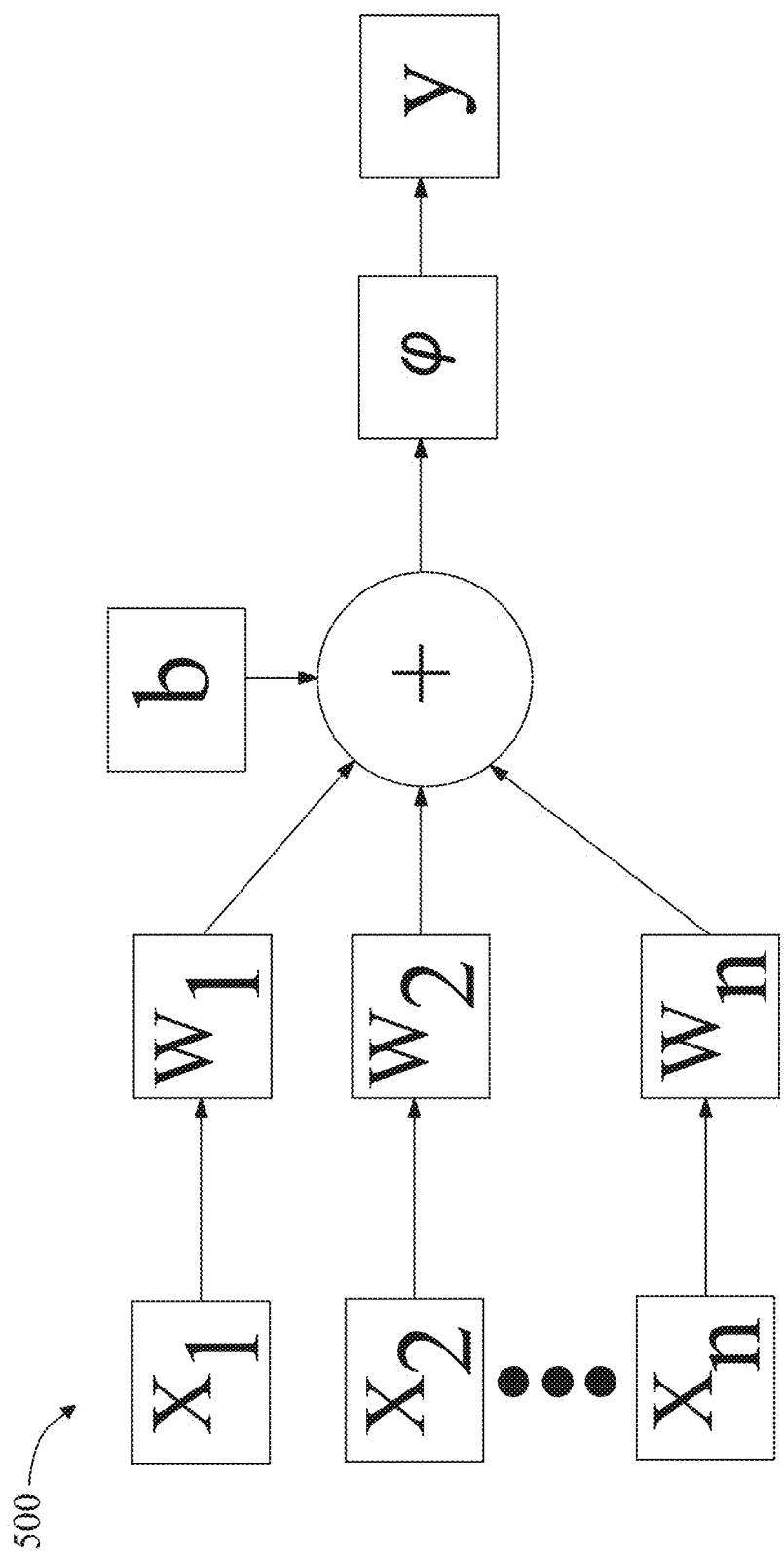
FIG. 5 is a diagram of an exemplary embodiment of a node of a neural network.

Referring now to FIG. 5, an exemplary embodiment of a node 500 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
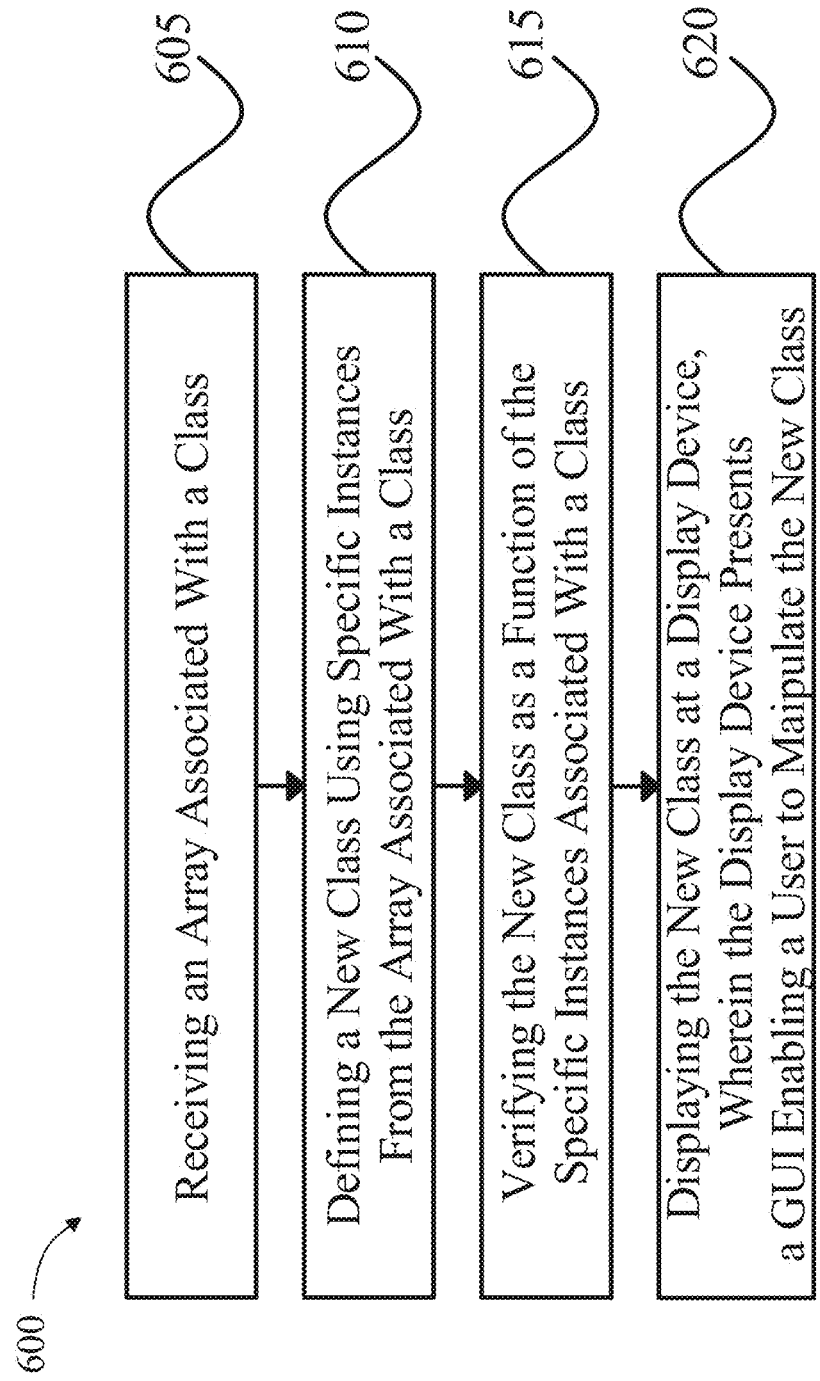
FIG. 6 is a flow diagram of an exemplary method for generating an instance array associated with an initial class.

Referring now to FIG. 6, a flow diagram illustrating an exemplary method 600 of generating an instance array associated with an initial class is shown. Method 600 of generating an instance array associated with an initial class may include a step 605 of receiving an array associated with an initial class. This may be implemented as discussed in reference to FIGS. 1-5. Method 600 of generating an instance array associated with an initial class may include a step 610 of defining a new class using specific instances from the array associated with an initial class. This may be implemented as discussed in reference to FIGS. 1-5. Method 600 of generating an instance array associated with an initial class may include a step 615 of verifying the new class as a function of the specific instances associated with an initial class. This may be implemented in reference to FIGS. 1-5. Method 600 of generating an instance array associated with an initial class may include a step 620 of displaying the objects of the new class at a display device, wherein the display device presents a GUI enabling a user to manipulate the objects of the new class. In an embodiment, method 600 of generating an instance array associated with an initial class may further include a step of transmitting the objects of the new class to a database. This may be implemented as discussed in reference to FIGS. 1-5.

Still referring to FIG. 6, step 610 of defining a new class using specific instances from the array associated with an initial class may further include a step of identifying one or more required criteria, a step of selecting specific instances base don the one or more required criteria, a step of selecting specific instances based on the one or more required criteria, a step of instantiating the new class using the specific instances based on the one or more required criteria, and a step of verifying the new class. This may be implemented as discussed in relation to FIGS. 1-5.

In further reference to FIG. 6, in an embodiment, method 600 of generating an instance array associated with an initial class may include a GUI that enables a user to adjust the objects of the new class by adding instances, deleting instances, and adjusting instances. In such an embodiment, method 600 of generating an instance array associated with an initial class may further include a step of authorization. The authorization process may include receiving an adjustment signal, generating a response signal as a function of a comparison of the adjustment signal, the objects of the new class, and an optimization metric, and transmitting the response signal to the GUI. This may be implemented in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
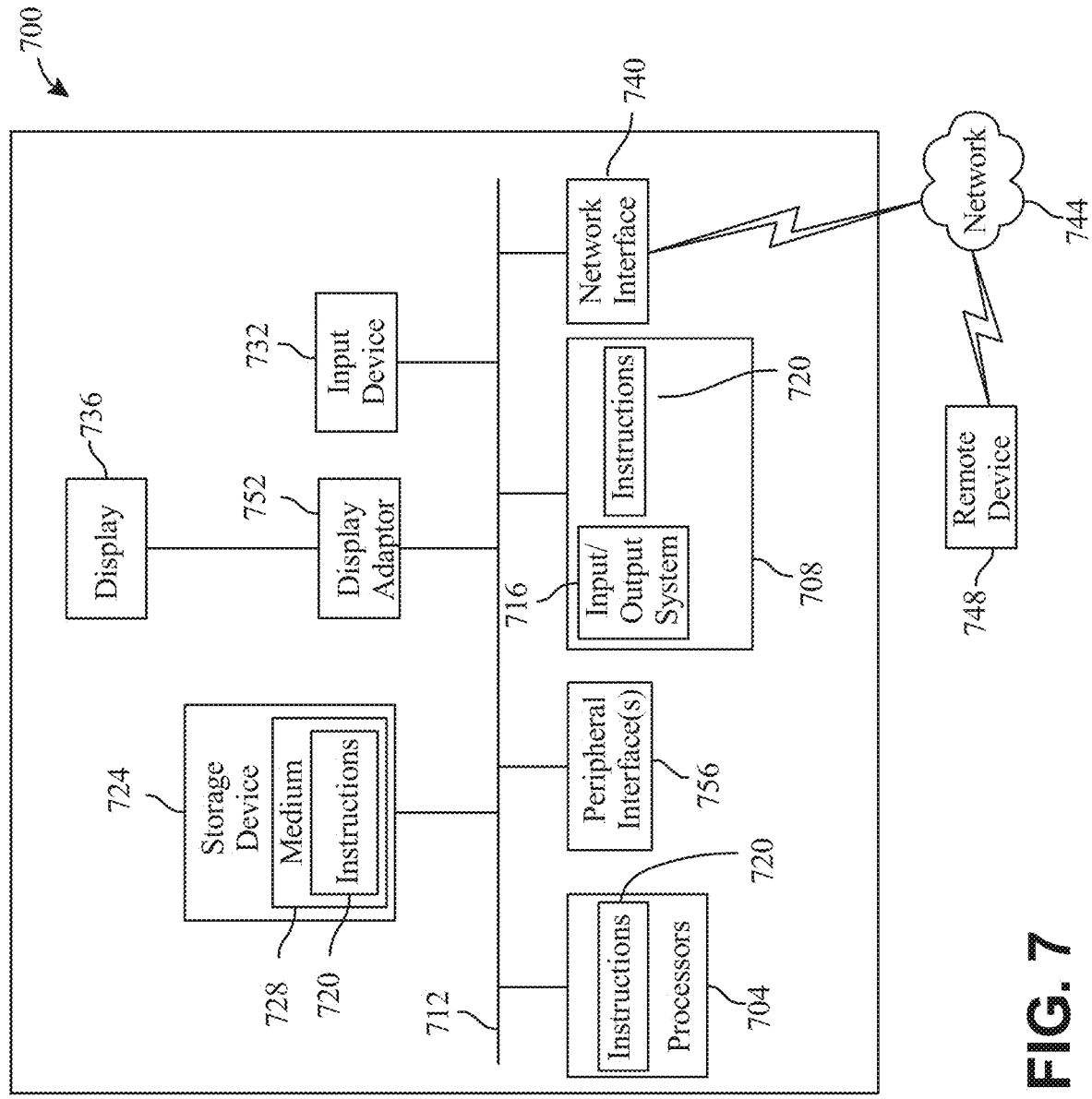
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for generating an instance array associated with an initial class, wherein the system comprises:
   at least a processor; and
   a memory communicatively connected to the at least a processor, wherein the memory contains instructions configuring the at least a processor to:
   receive an array associated with an initial class;
   define a new class using specific instances from the array associated with the class, wherein defining the new class using specific instances from the array associated with the initial class comprises:
      identifying one or more required criteria, wherein identifying the one or more required criteria is accomplished using a parameter module;
      selecting specific instances based on the one or more required criteria; and
      instantiating the new class using the specific instances based on the one or more required criteria;
   verify the new class as a function of the specific instances associated with the class; and
   display one or more objects of the new class at a display device, wherein the display device presents a graphical user interface (GUI) enabling a user to manipulate the new class; and
   wherein the GUI enables a user to adjust the new class by adding instances, deleting instances, and adjusting instances, wherein the adjustment of the new class further comprises an authorization process, wherein the authorization process comprises:
      receiving, at the at least a processor, an adjustment signal;
      generating a response signal as a function of a comparison of the adjustment signal, the new class, and an optimization metric; and
      transmitting the response signal to the GUI.

2. The system of claim 1, wherein the array associated with an initial class comprises one or more identifiers.

3. The system of claim 2, wherein the array associated with an initial class further comprises one or more optimization metrics.

4. The system of claim 1, wherein the array associated with an initial class is received from one or more external systems configured to pre-process the array associated with an initial class, wherein pre-processing the array comprises generating one or more identifiers and one or more optimization metrics.

5. The system of claim 1, wherein the processor is further configured to transmit the new class to a database.

6. The system of claim 1, wherein generating a response signal is accomplished using a machine-learning model.

7. The system of claim 6, wherein the machine-learning model is trained using exemplary adjustment signals and exemplary optimization metrics correlated with exemplary response signals.

8. The system of claim 7, wherein the machine-learning model is retrained using user adjustments to the new class.

9. A method for generating an instance array associated with an initial class, wherein the method comprises:
   receiving an array associated with an initial class;
   defining objects of a new class using specific instances from the array associated with an initial class, wherein defining the new class using specific instances from the array associated with the initial class comprises:
      identifying one or more required criteria, wherein identifying the one or more required criteria is accomplished using a parameter module;
      selecting specific instances based on the one or more required criteria; and
      instantiating the new class using the specific instances based on the one or more required criteria;
   verifying the new class as a function of the specific instances associated with an initial class; and displaying one or more objects of the new class at a display device, wherein the display device presents a graphical user interface (GUI) enabling a user to manipulate the new class; and wherein the GUI enables a user to adjust the new class by adding instances, deleting instances, and adjusting instances, wherein the adjustment of the new class further comprises an authorization process, wherein the authorization process comprises:
  receiving, at the at least a processor, an adjustment signal;
  generating a response signal as a function of a comparison of the adjustment signal, the new class, and an optimization metric; and
  transmitting the response signal to the GUI.

10. The method of claim 9, wherein the array associated with an initial class comprises one or more identifiers.

11. The method of claim 10, wherein the array associated with an initial class further comprises one or more optimization metrics.

12. The method of claim 9, wherein the array associated with an initial class is received from one or more external systems configured to pre-process the array associated with an initial class, wherein pre-processing the array comprises generating one or more identifiers and one or more optimization metrics.

13. The method of claim 9, wherein the method further comprises transmitting the new class to a database.

14. The method of claim 9, wherein generating a response signal is accomplished using a machine-learning model.

15. The method of claim 14, wherein the machine-learning model is trained using exemplary adjustment signals and exemplary optimization metrics correlated with exemplary response signals.

16. The method of claim 15, wherein the machine-learning model is retrained using user adjustments to the new class.

\* \* \* \* \*